(12) United States Patent
Schueneman

(10) Patent No.: US 8,325,500 B2
(45) Date of Patent: Dec. 4, 2012

(54) INVERTER FILTER INCLUDING DIFFERENTIAL MODE AND COMMON MODE, AND SYSTEM INCLUDING THE SAME

(75) Inventor: Ron C. Schueneman, Arden, NC (US)

(73) Assignee: Eaton Corporation, Cleveland, OH (US)

( * ) Notice: Subject to any disclaimer, the term of this patent is extended or adjusted under 35 U.S.C. 154(b) by 113 days.

(21) Appl. No.: 12/835,250

(22) Filed: Jul. 13, 2010

(65) Prior Publication Data

US 2012/0014143 A1    Jan. 19, 2012

(51) Int. Cl.
*H02M 1/12* (2006.01)

(52) U.S. Cl. .......................................................... 363/47
(58) Field of Classification Search .................. 363/39, 363/40, 44, 45, 47
See application file for complete search history.

(56) References Cited

U.S. PATENT DOCUMENTS

| | | | | |
|---|---|---|---|---|
| 5,757,628 | A * | 5/1998 | Kamata ............................ | 361/40 |
| 5,999,423 | A * | 12/1999 | Steinke et al. .................... | 363/40 |
| 6,208,537 | B1 * | 3/2001 | Skibinski et al. ................ | 363/40 |
| 7,062,662 | B2 * | 6/2006 | Gauthier et al. ................ | 713/300 |
| 7,068,005 | B2 * | 6/2006 | Baker ............................ | 318/611 |
| 7,091,704 | B2 * | 8/2006 | Chou et al. ..................... | 323/207 |
| 7,095,636 | B2 * | 8/2006 | Sarlioglu ........................ | 363/39 |
| 7,164,259 | B1 * | 1/2007 | Megaw et al. ................. | 323/313 |
| 7,301,787 | B2 * | 11/2007 | Wu et al. ......................... | 363/39 |
| 7,570,500 | B2 * | 8/2009 | Mayell et al. .................... | 363/40 |
| 7,606,052 | B2 * | 10/2009 | Akagi .............................. | 363/40 |
| 7,746,020 | B2 * | 6/2010 | Schnetzka et al. ............. | 318/632 |
| 7,957,166 | B2 * | 6/2011 | Schnetzka et al. .......... | 363/56.03 |
| 7,965,525 | B2 * | 6/2011 | Huang ............................. | 363/39 |
| 7,994,876 | B2 * | 8/2011 | Feng et al. ..................... | 333/181 |
| 8,027,137 | B2 * | 9/2011 | Hamstra et al. ............... | 361/119 |
| 8,115,444 | B2 * | 2/2012 | De et al. ......................... | 318/801 |
| 8,174,853 | B2 * | 5/2012 | Kane et al. ..................... | 363/40 |
| 2006/0043920 | A1 * | 3/2006 | Baker ............................. | 318/611 |
| 2007/0077819 | A1 * | 4/2007 | Thomson et al. ........ | 439/620.01 |
| 2007/0120607 | A1 * | 5/2007 | Pelly ............................. | 330/302 |

FOREIGN PATENT DOCUMENTS

WO   WO2009013996   *   1/2009

* cited by examiner

*Primary Examiner* — Adolf Berhane
(74) *Attorney, Agent, or Firm* — Eckert Seamans Cherin & Mellott, LLC; Kirk D. Houser

(57) ABSTRACT

An inverter filter is for a plurality of phases. The inverter filter includes a node; a differential mode filter including for each of the phases a first terminal, a second terminal, an inductor electrically connected between the first terminal and the second terminal, and first capacitor electrically connected between the inductor and the node. The inverter filter also includes a third terminal structured to be grounded, and a common mode filter. The common mode filter includes a resistor, and a second capacitor electrically connected in series with the resistor between the node and the third terminal.

12 Claims, 4 Drawing Sheets

INVERTER FILTER INCLUDING DIFFERENTIAL MODE AND COMMON MODE, AND SYSTEM INCLUDING THE SAME

BACKGROUND

1. Field

The disclosed concept pertains generally to electrical filters and, more particularly, to inverter filters having differential mode and common mode filter characteristics. The disclosed concept also pertains to systems including an inverter filter.

2. Background Information

As shown in FIG. 1, a voltage source inverter 2 generates a three-phase alternating current (AC) power output 4 using one of many known pulse width modulated (PWM) control algorithms 5. Power is drawn from a direct current (DC) power source 6 and energy is stored in a capacitor bank 8. The DC power source 6 can be, for example and without limitation, a 6-pulse rectifier buffered by AC reactance (not shown) of a three-phase power source 10 and/or by a reactor (not shown) added on the AC side 12 or DC side 14 of the DC power source 6. Relatively larger systems can employ, for example, 12, 18, 24 or more pulses in conjunction with a multi-pulse reactor (not shown) or transformer (not shown) to remove harmonics drawn from the three-phase power source 10.

The voltage source inverter 2 powers a three-phase load 16 through a three-phase output filter 18. Non-limiting examples of the three-phase load 16 include an induction motor, a permanent magnet motor, a synchronous motor, a transformer structured to change the voltage level of a line-to-line output circuit, and a resistive load bank. Two known non-limiting examples of inverter output filters include a sine filter 40 (shown in FIG. 3) and a dV/dt filter 42 (shown in FIG. 4), which only filter the line-to-line power output 4 of the voltage source inverter 2.

Common mode problems arise in low voltage systems from an inverter (e.g., without limitation, the voltage source inverter 2 of FIG. 1) including transistors with parasitic capacitance coupled to ground G. The example load 16 and its load power cables 19 also have parasitic capacitance to ground G. This forms a common mode or zero sequence loop of current flow that is largely orthogonal in terms of energy or power transfer to the intended differential three-phase power circuit. In medium voltage variable frequency drive systems, for example, some topologies also have a ground electrical connection (e.g., a separate ground electrical conductor is included with the three-phase AC power electrical conductors), in order that the three-phase power output is ground referenced.

Typically, when common mode (line-to-ground) problems arise in a variable frequency drive system, a separate common mode filter (e.g., common mode filter 44 of FIG. 3 including three-phase common mode inductor $L_{CM}$ and capacitors $C_{CM}$) is added to remedy the problem. However, the size and the cost of this separate common mode filter 44 are approximately equal to the size and the cost of the original line-to-line inverter output filter 18 (FIG. 1), the sine filter 40 (FIG. 3) or the dV/dt filter 42 (FIG. 4).

Referring to FIG. 2, in order to have power flow from a load 20 back to an AC power source 22 or from a generator 24 back to a power grid 26, a passive direct current (DC) power source, such as a passive rectifier (e.g., the DC power source 6 of FIG. 1), is replaced by an active rectifier (e.g., without limitation, a PWM rectifier 28). The corresponding power electronics circuit employed for this purpose is typically called an active front end (AFE) 30. The AFE 30, like a voltage source inverter 2 (FIG. 1), generates a square wave and needs to be filtered by an AFE filter 32 before electrical connection to the AC power source 22 or power grid 26. The AFE filter 32 also has significant common mode currents flowing from the active rectifier, such as the PWM rectifier 28, to the AC power source 22 or power grid 26 and back to ground 34.

FIG. 3 shows the known sine filter 40 and the known common mode filter 44. These two separate components can be used in place of the three-phase output filter 18 of FIG. 1. The separate common mode filter 44 can also be used with the AFE filter 32 of FIG. 2 to reduce common mode currents. The capacitor(s) that comprise Cf can be individual (i.e., one per phase), or enclosed in a three-terminal can (not shown) in a wye configuration (not shown).

FIG. 4 shows the known dV/dt filter 42, which, similar to the sine filter 40 of FIG. 3, can be used upstream of the common mode filter 44 of FIG. 3.

There is room for improvement in inverter filters.

There is further room for improvement in systems including an inverter filter.

SUMMARY

These needs and others are met by embodiments of the disclosed concept, which improve a differential mode inverter filter in order to also provide a common mode (line-to-ground) filter function.

Preferably, low cost components are employed to form an electrical filter to ground that significantly reduces common mode currents.

In accordance with one aspect of the disclosed concept, an inverter filter for a plurality of phases comprises: a node; a differential mode filter comprising for each of the plurality of phases: a first terminal, a second terminal, an inductor electrically connected between the first terminal and the second terminal, and a first capacitor electrically connected between the inductor and the node; a third terminal structured to be grounded; and a common mode filter comprising: a resistor, and a second capacitor electrically connected in series with the resistor between the node and the third terminal.

As another aspect of the disclosed concept, a system for a power source having a plurality of phases comprises: a voltage source inverter structured to interface the plurality of phases to or from the power source, and to interface a plurality of inputs from a generator or a plurality of outputs to a load; and a filter comprising: a node, a differential mode filter comprising for each of the plurality of phases: a first terminal electrically connected to a corresponding one of the plurality of phases, a second terminal electrically connected to a corresponding one of the plurality of inputs or a corresponding one of the plurality of outputs, an inductor electrically connected between the first terminal and the second terminal, and a first capacitor electrically connected between the inductor and the node, a third terminal structured to be grounded, and a common mode filter comprising: a resistor, and a second capacitor electrically connected in series with the resistor between the node and the third terminal.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality). As employed herein, the term "electrical conductor" shall mean a wire (e.g., solid; stranded; insulated; non-insulated), a copper conductor, an aluminum conductor, a suitable metal conductor, or other suitable material or object that permits an electric current to flow easily.

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

As employed herein, the term "node" shall mean an electrical connection point for a number of electrical conductors, or an electrical connection point for a number of electrical components.

As employed herein, the term "terminal" shall mean a node structured to be electrically connected to a number of electrical conductors or to an electrical apparatus.

As employed herein, the term "interface" shall mean to input and/or to output.

As employed herein, the term "power source" shall mean a source of electrical power (e.g., without limitation, an inverter; any suitable alternating current power source), or a power grid.

As employed herein, the term "power grid" shall mean a network of electrical conductors for distribution of electrical power, or a distribution network for electrically connecting a plurality of sources of power to a number of loads.

As employed herein, the term "electrically connected between" two terminals shall mean that an electrical component, device or apparatus is electrically connected to each of the two terminals, is electrically connected in series with a number of other electrical components and is intermediate the two terminals, or is electrically connected in series with a number of other electrical components and is electrically connected to one of the two terminals.

The disclosed concept is described in association with three-phase electrical filters and systems, although the disclosed concept is applicable to a wide range of electrical filters and systems for a plurality of phases.

EXAMPLE 1

Figure 5:
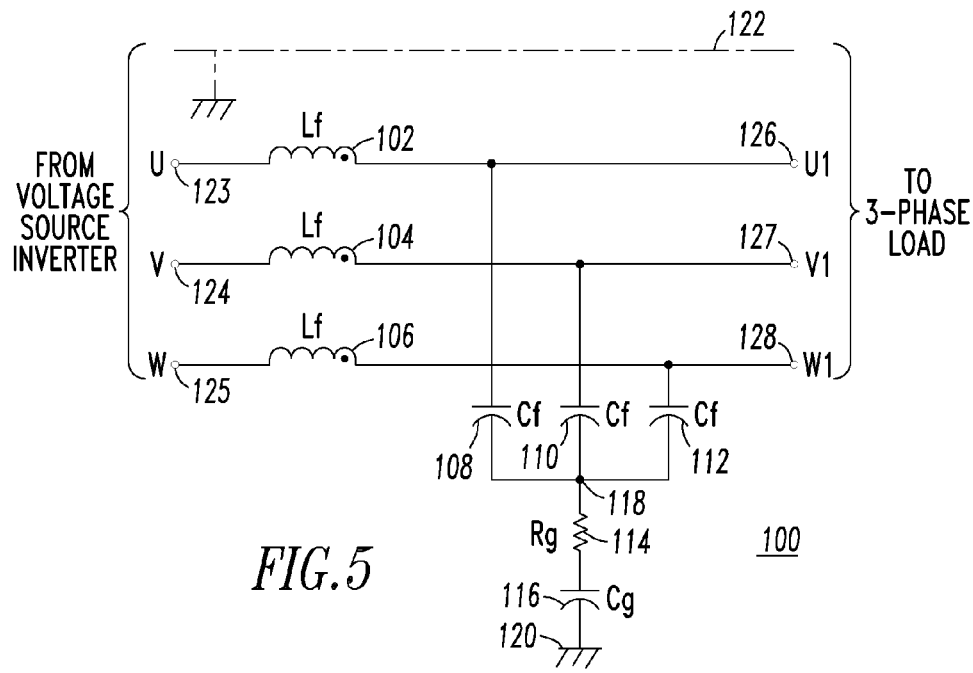
FIG. 5 is a block diagram in schematic form of a sine filter with common mode filtering in accordance with an embodiment of the disclosed concept.

FIG. 5 shows a three-phase sine filter 100 with a common mode filtering function. For example, in this electrical filter 100, common mode current flows through the parallel combination of three inductors (Lf) 102,104,106. The common mode current is created by the voltages of the phases (U,V,W) at the three-phase terminals 123,124,125 rising and falling simultaneously and is an artifact of pulse width modulation of voltage source inverter transistors (not shown, but see the voltage source inverter 2 and PWM control algorithms 5 of FIG. 1). The electrical filter 100 includes, as part of the conventional sine filter function, three capacitors (Cf) 108, 110,112. The electrical filter 100 further includes, as part of a common mode filter function, the series combination of a resistor (Rg) 114 and a capacitor (Cg) 116. The series combination of the resistor Rg 114 and the capacitor Cg 116 is electrically connected between a node 118, which is electrically connected to each of the three capacitors (Cf) 108,110, 112, and a ground terminal 120. The electrical filter 100 provides filtered voltages for the phases (U1,V1,W1) at the three-phase terminals 126,127,128 to a three-phase load (not shown, but see the three-phase load 16 of FIG. 1).

The inverter filter 100 of FIG. 5 is for three example phases U,V,W. This electrical filter 100 includes the node 118, the terminal 120 structured to be grounded, a common mode filter including the resistor (Rg) 114 and the capacitor (Cg) 116, and a sine filter. The sine filter includes, for each of the three example phases U,V,W, a first terminal 123,124,125, a second terminal 126,127,128, an inductor 102,104,106 electrically connected between the first terminal 123,124,125 and the second terminal 126,127,128, respectively, and a capacitor 108,110,112 electrically connected between the respective inductor 102,104,106 and the node 118.

EXAMPLE 2

Figure 6:
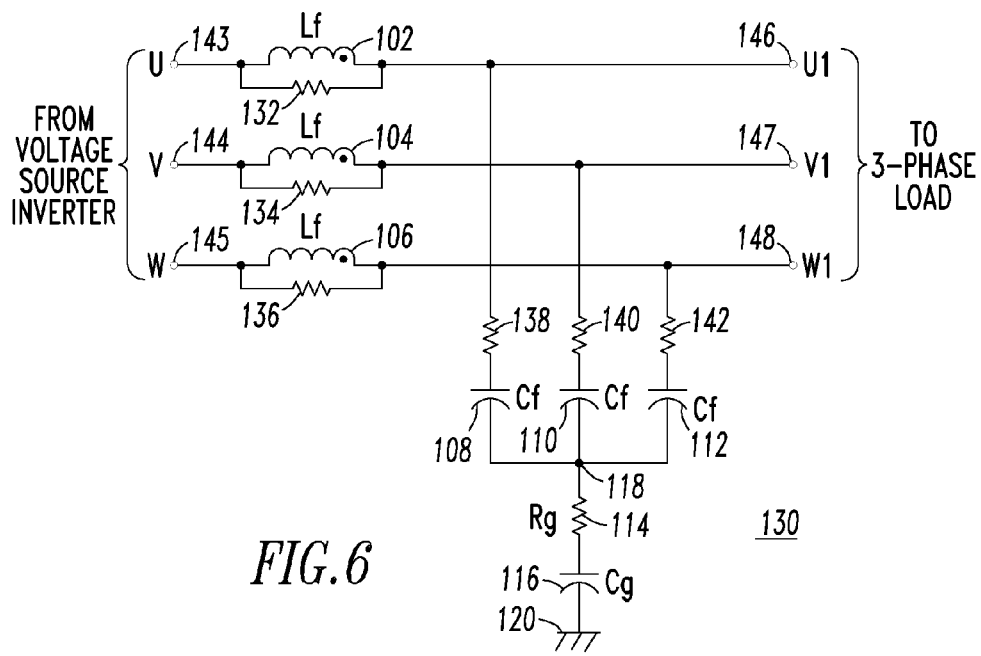
FIG. 6 is a block diagram in schematic form of a dV/dt filter with common mode filtering in accordance with another embodiment of the disclosed concept.

FIG. 6 shows a three-phase dV/dt filter 130 with a common mode filtering function. The electrical filter 130 is somewhat similar to the electrical filter 100 of FIG. 5, except that it also includes resistors 132,134,136 electrically connected in parallel with the respective inductors 102,104,106, and resistors 138,140,142 electrically connected in series with the respective capacitors 108,110,112. Like the electrical filter 100, the electrical filter 130 includes the parallel combination of three inductors (Lf) 102,104,106, and, as part of a common mode filter function, the series combination of the resistor (Rg) 114 and the capacitor (Cg) 116. The series combination of the resistor Rg 114 and the capacitor Cg 116 is electrically connected between the node 118, which is electrically connected to each of the three capacitors (Cf) 108,110,112, and the ground terminal 120.

The inverter filter 130 of FIG. 6 is for three example phases U,V,W. This electrical filter 130 includes the node 118, the terminal 120 structured to be grounded, a common mode filter including the resistor (Rg) 114 and the capacitor (Cg) 116, and a dV/dt filter. The dV/dt filter includes, for each of the three example phases U,V,W, a first terminal 143,144,145, a second terminal 146,147,148, an inductor 102,104,106 electrically connected between the first terminal 143,144,145 and the second terminal 146,147,148, respectively, and a capacitor 108,110,112 electrically connected between the respective inductor 102,104,106 and the node 118. The dV/dt filter also includes, for each of the three example phases U,V,W, resistors 132,134,136 electrically connected in parallel with the respective inductors 102,104,106, and resistors 138,140, 142 electrically connected in series with the respective capacitors 108,110,112.

EXAMPLE 3

Figure 7:
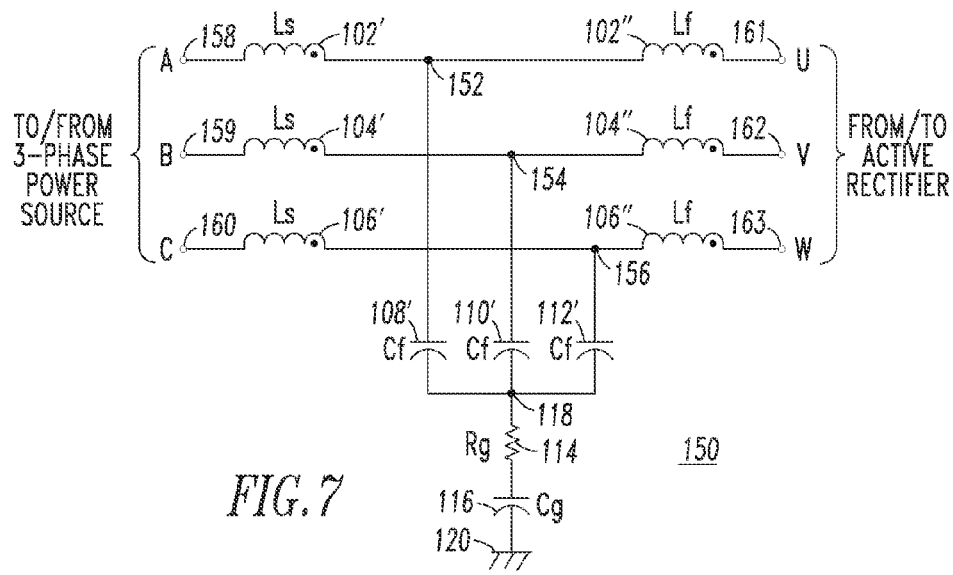
FIG. 7 is a block diagram in schematic form of an active front end filter with common mode filtering in accordance with another embodiment of the disclosed concept.

FIG. 7 shows a three-phase active front end filter 150 with a common mode filtering function. For each phase (A,U, B,V and C,W), an inductance is formed by the series combination of two inductors (Ls, Lf) 102',102", 104',104" and 106',106", which series combination is electrically connected between two terminals 161,158, 162,159 and 163,160, respectively. The three-phase terminals 158,159,160 are electrically connected to or from a three-phase power source or power grid (not shown, but see the three-phase power source 22 or power grid 26 of FIG. 2) and the other three-phase terminals 161, 162,163 are electrically connected from or to an active rectifier (not shown, but see the PWM rectifier 28 of FIG. 2). Each of the capacitors (Cf) 108',110',112' is electrically connected between their common node 118 and another node 152,154, 156 between the corresponding first inductor (Lf) 102",104", 106" and the corresponding second inductor (Ls) 102',104', 106', respectively. The capacitors (Cf) 108',110',112' and the inductors (Ls) 102',104',106' and (Lf) 102",104",106" form an active front end filter for a voltage source inverter (not shown, but see the voltage source inverter with the PWM rectifier 28 of FIG. 2). Like the electrical filter 100 of FIG. 5, the electrical filter 150 includes, as part of a common mode filter function, the series combination of the resistor (Rg) 114 and the capacitor (Cg) 116. The series combination of the resistor Rg 114 and the capacitor Cg 116 is electrically connected between the node 118, which is electrically connected to each of the three capacitors (Cf) 108',110',112', and the ground terminal 120.

The inverter filter 150 of FIG. 7 is for three example phases A,B,C or U,V,W. This electrical filter 150 includes the node 118, the terminal 120 structured to be grounded, a common mode filter including the resistor (Rg) 114 and the capacitor (Cg) 116, and an active front end filter. The active front end filter 150 includes, for each of the three example phases A,B,C or U,V,W, a first terminal 161,162,163, a second terminal 158,159,160, an inductor (Ls) 102',104',106' electrically connected between the first terminal 161,162,163 and the second terminal 158,159,160, respectively, and a capacitor 108',110',112' electrically connected between the respective inductor (Lf) 102",104",106" and the node 118. The active front end filter 150 also includes, for each of the three example phases A,B,C or U,V,W, a second inductor (Ls) 102',104',106' electrically connected in series with the first inductor (Lf) 102",104",106" between the first terminal 161, 162,163 and the second terminal 158,159,160.

EXAMPLE 4

The inductors (Lf or Ls) in each of the example three-phase filters 100 (FIG. 5), 130 (FIG. 6) and 150 (FIG. 7) would normally be implemented with a three-phase reactor because of size, weight and cost advantages. For example, the common mode inductance (Lcm) is equal to Lf/3 when three individual inductors are employed. However, one three-phase reactor (not shown) having three iron core legs and a coil wound on each of the three iron core legs is much cheaper and takes up even less space in an electrical cabinet. This construction inherently has less common mode inductance. Hence, Lcm<Lf/3 for a three-leg iron core reactor.

It is knowledge of how to raise Lcm, particularly in low voltage three-phase reactors, that makes the disclosed concept practical. For example, a 1.0 mH three-phase low voltage reactor would typically have a common mode inductance of only about 50 µH (i.e., Lcm=0.05*Lf).

A typical three-phase inductor having three iron core legs and three coils provides the same inductance as the inductance of three individual inductors of any suitable construction type, but only for a balanced three-phase sinusoidal circuit. Because an inverter has ground-referenced voltage steps that are common to all three phases and because any real world load has capacitance to ground, a common mode circuit exists that is separate from the intended differential mode circuit that controls, for example, the speed of the motor. The three-leg iron core reactor construction has no theoretical common mode inductance because the flux in the three iron core legs cancels. Of course, real world inductors have leakage inductance or, in terms relating to equations that govern coupled inductor design, the magnetic coupling between real world coils is less than 1.0. In other words, every three-phase set of inductors having inductance, Lf, has a common mode inductance, Lcm, that is less than Lf/3 but greater than zero (i.e., 0<Lcm<Lf/3).

The selection of resistor (Rg) 114 and capacitor (Cg) 116 is a function of how much common mode filtering is desired, and the magnitude of Lcm is a function of Lf. The easiest thing to achieve is dV/dt reduction from each filter output phase-to-ground such that transient peaks do not grow with relatively long distances to the load. This "dV/dt reduction" removes the higher end of the spectrum that can, for example, damage motor bearings, cause early failure of cable insulation, and, in the case of an AFE filter on a wind generator system, stop AM radio interference in the area around a wind farm.

EXAMPLE 5

In the case of low voltage (i.e., a distribution voltage of less than 1000 V) reactors, 0.05*Lf<Lcm<0.07*Lf.

EXAMPLE 6

For medium voltage (i.e., a distribution voltage of about 1 kV to about 10 kV) reactors, 0.1*Lf<Lcm<0.22*Lf.

EXAMPLE 7

It will be appreciated that the phases U,V,W of FIGS. 5 and 6, and the phases A,B,C of FIG. 7, can be phases with or without a ground. For example, FIG. 5 shows (in phantom line drawing) a ground 122 with the three phases U,V,W.

EXAMPLE 8

Figure 8:
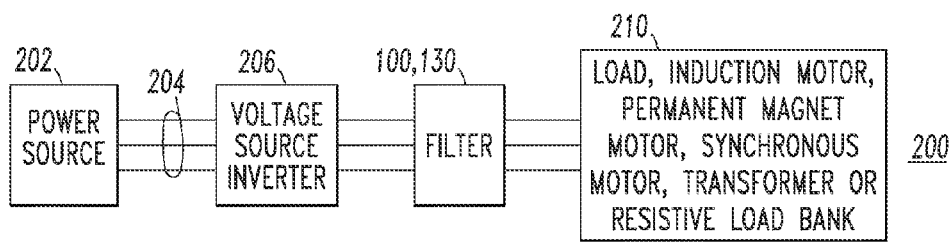
FIGS. 8 and 9 are block diagrams in schematic form of systems in accordance with other embodiments of the disclosed concept.

FIG. 8 shows a system 200 including one of the filters 100,130 of FIGS. 5 and 6. The system 200 is for a power source 202 having a plurality of phases 204. The system 200 includes a voltage source inverter 206 structured to interface the plurality of phases 204 from the power source 202, and to interface a plurality of outputs to a load 210 through one of the filters 100,130.

Figure 9:
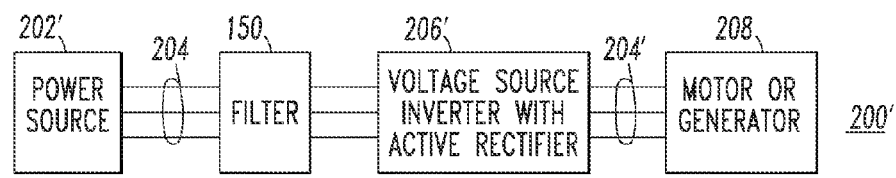

FIG. 9 shows a system 200' including the filter 150 of FIG. 7. The system 200' is for a power source 202' having a plurality of phases 204 and a motor or generator 208 having a plurality of phases 204'. The system 200' includes a voltage source inverter (with active rectifier) 206' structured to interface the plurality of phases 204 to or from the power source 202', and to interface a plurality of inputs from the motor or generator 208 or a plurality of outputs to the motor 208.

It will be appreciated that the system 200' can also employ one of the filters 100,130 of FIGS. 5 and 6 between the voltage source inverter (with active rectifier) 206' and the motor 208.

EXAMPLE 9

The load 210 can be selected from the group consisting of an induction motor, a permanent magnet motor, a synchronous motor, a transformer, and a resistive load bank.

EXAMPLE 10

The systems 200,200' can be low voltage systems, variable frequency drive systems, or medium voltage variable frequency drive systems.

EXAMPLE 11

The plurality of phases 204,204' can be three phases with or without a ground (not shown, but see the ground 122 shown in phantom line drawing in FIG. 5).

EXAMPLE 12

Figure 2:
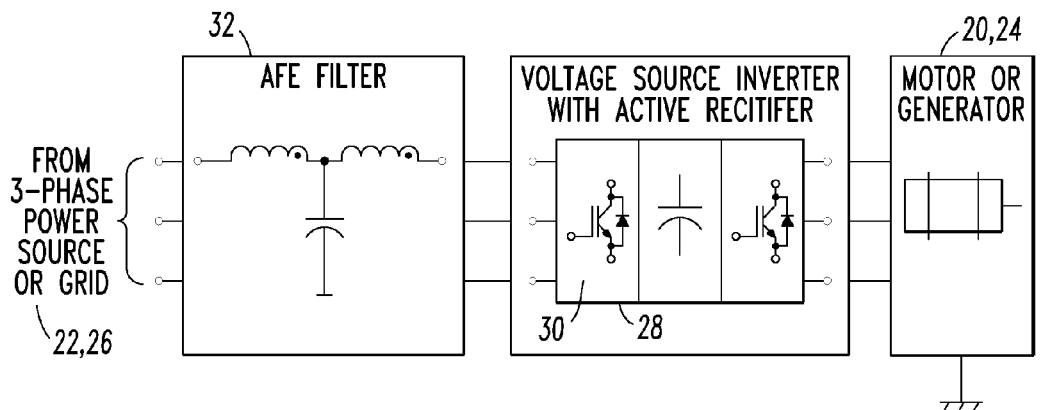
FIG. 2 is a block diagram in schematic form of an active front end filter, a voltage source inverter with active rectifier, and a motor or generator.
Figure 3:
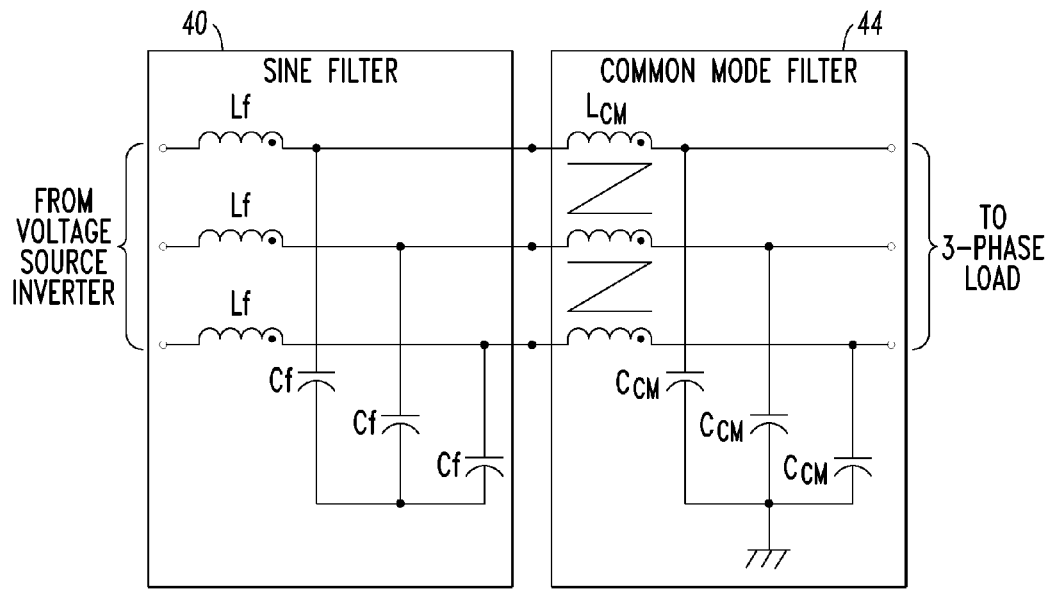
FIG. 3 is a block diagram in schematic form of a sine filter and a separate common mode filter.
Figure 4:
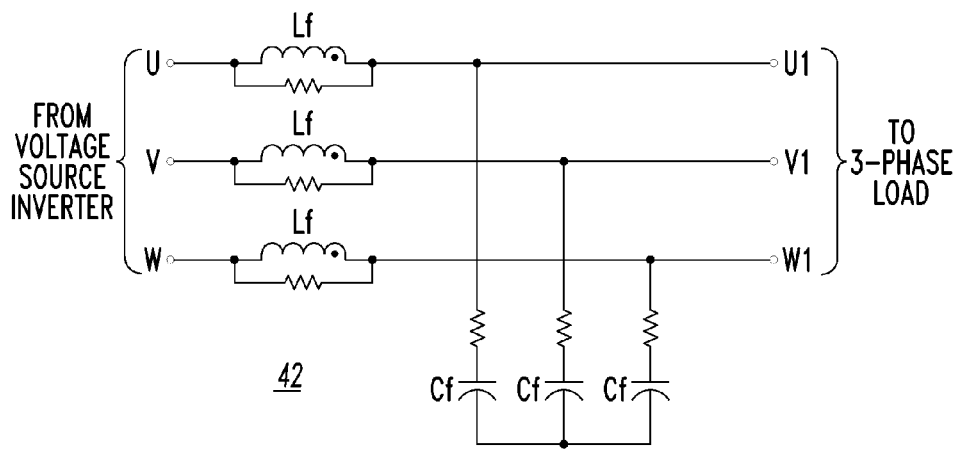
FIG. 4 is a block diagram in schematic form of a dV/dt filter.

The voltage source inverter 206' includes an active front end or active rectifier (not shown, but see, for example, the PWM rectifier 28 of FIG. 2). If the motor or generator 208 is a motor, the power source 202' can be a power grid, and the active front end voltage source inverter 206' can be further structured to enable reverse power flow (e.g., during braking) from the motor to the power grid.

EXAMPLE 13

The active front end voltage source inverter 206' can be structured to enable power flow from the generator 208 to the power source 202', which, in this example, is a power grid.

EXAMPLE 14

Figure 1:
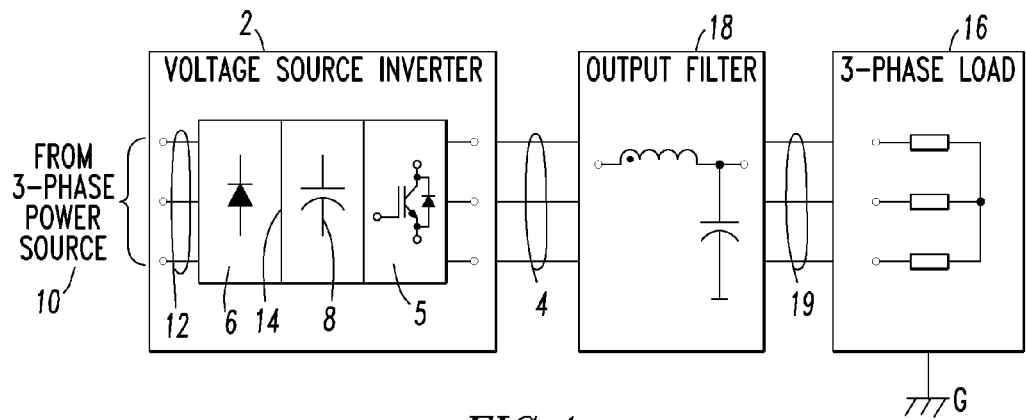
FIG. 1 is a block diagram in schematic form of a voltage source inverter, an output filter and a three-phase load.

The voltage source inverter 206 can include a passive rectifier (not shown, but see the DC power source 6 of FIG. 1).

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An inverter filter for a plurality of phases output by an inverter, said inverter filter comprising:
   a node;
   a differential mode filter comprising for each of said plurality of phases output by said inverter:
      a first terminal,
      a second terminal,
      an inductor electrically connected between the first terminal and the second terminal, and
      a first capacitor electrically connected between said inductor and said node;
   a third terminal which is grounded; and
   a common mode filter comprising:
      a resistor, and
      a second capacitor electrically connected in series with the resistor between said node and said third terminal,
   wherein said differential mode filter is selected from the group consisting of a sine filter and a dV/dt filter,
   wherein said first capacitor is electrically connected between said second terminal and said node,
   wherein said plurality of phases are three phases,
   wherein the inductor for each of said three phases has an inductance, Lf,
   wherein said three phases include three inductors having a common mode inductance, Lcm,
   wherein said three inductors form a three-phase, three-leg iron core reactor, and
   wherein said three phases have a low voltage and $0.05*Lf<Lcm<0.07*Lf$, or said three phases have a medium voltage and $0.1*Lf<Lcm<0.22*Lf$.

2. An inverter filter for a plurality of phases output by an inverter, said inverter filter comprising:
   a node;
   a differential mode filter comprising for each of said plurality of phases output by said inverter:
      a first terminal,
      a second terminal,
      an inductor electrically connected between the first terminal and the second terminal, and
      a first capacitor electrically connected between said inductor and said node;
   a third terminal which is grounded; and
   a common mode filter comprising:
      a resistor, and
      a second capacitor electrically connected in series with the resistor between said node and said third terminal,
   wherein said resistor is a first resistor; and wherein said differential mode filter further comprises for each of said plurality of phases a second resistor electrically connected in parallel with said inductor and a third resistor electrically connected in series with said first capacitor,
   wherein said differential mode filter is selected from the group consisting of a sine filter and a dV/dt filter,
   wherein said first capacitor is electrically connected between said second terminal and said node,
   wherein said plurality of phases are three phases,
   wherein the inductor for each of said three phases has an inductance, Lf,
   wherein said three phases include three inductors having a common mode inductance, Lcm,
   wherein said three inductors form a three-phase, three-leg iron core reactor, and
   wherein said three phases have a low voltage and $0.05*Lf<Lcm<0.07*Lf$, or said three phases have a medium voltage and $0.1*Lf<Lcm<0.22*Lf$.

3. The inverter filter of claim 1 wherein said three phases are with or without a ground.

4. A system for a power source having a plurality of phases, said system comprising:
   a voltage source inverter structured to interface said plurality of phases to or from said power source, and to interface a plurality of inputs from a generator or a plurality of outputs to a load; and
   a filter electrically connected between said voltage source inverter and said load, said filter comprising:
      a node,
      a differential mode filter comprising for each of said plurality of phases interfaced by said voltage source inverter:

a first terminal electrically connected to a corresponding one of said plurality of phases,
a second terminal electrically connected to a corresponding one of said plurality of inputs or a corresponding one of said plurality of outputs,
an inductor electrically connected between the first terminal and the second terminal, and
a first capacitor electrically connected between said inductor and said node,
a third terminal which is grounded, and
a common mode filter comprising:
a resistor, and
a second capacitor electrically connected in series with the resistor between said node and said third terminal,
wherein said differential mode filter is selected from the group consisting of a sine filter and a dV/dt filter,
wherein said first capacitor is electrically connected between said second terminal and said node,
wherein said plurality of phases are three phases,
wherein the inductor for each of said three phases has an inductance, Lf,
wherein said three phases include three inductors having a common mode inductance, Lcm,
wherein said three inductors form a three-phase, three-leg iron core reactor, and
wherein said three phases have a low voltage and 0.05*Lf<Lcm<0.07*Lf, or said three phases have a medium voltage and 0.1*Lf<Lcm<0.22*Lf.

5. The system of claim 4 wherein said load is selected from the group consisting of an induction motor, a permanent magnet motor, a synchronous motor, a transformer, and a resistive load bank.

6. The system of claim 4 wherein said system is a low voltage system, and wherein said three phases have said low voltage and 0.05*Lf<Lcm<0.07*Lf.

7. The system of claim 4 wherein said system is a variable frequency drive system.

8. The system of claim 4 wherein said system is a medium voltage variable frequency drive system, and wherein said three phases have said medium voltage and 0.1*Lf<Lcm<0.22*Lf.

9. The system of claim 4 wherein said three phases are without a ground.

10. The system of claim 4 wherein said three phases are with a ground.

11. The system of claim 4 wherein said voltage source inverter comprises a passive rectifier.

12. The system of claim 4 wherein said resistor is a first resistor; and wherein said differential mode filter further comprises for each of said plurality of phases a second resistor electrically connected in parallel with said inductor and a third resistor electrically connected in series with said first capacitor.

* * * * *